(12) United States Patent
Takano

(10) Patent No.: US 11,217,071 B2
(45) Date of Patent: Jan. 4, 2022

(54) READING APPARATUS

(71) Applicant: TOSHIBA TEC KABUSHIKI KAISHA, Tokyo (JP)

(72) Inventor: Yutaka Takano, Izunokuni Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 223 days.

(21) Appl. No.: 16/527,688

(22) Filed: Jul. 31, 2019

(65) Prior Publication Data

US 2019/0355223 A1 Nov. 21, 2019

Related U.S. Application Data

(63) Continuation of application No. 15/647,791, filed on Jul. 12, 2017, now abandoned.

(30) Foreign Application Priority Data

Jul. 25, 2016 (JP) ................................. 2016-145651

(51) Int. Cl.
*G07G 1/00* (2006.01)
*H01Q 1/22* (2006.01)
(Continued)

(52) U.S. Cl.
CPC ........... *G07G 1/009* (2013.01); *G06K 7/0008* (2013.01); *G06K 7/10099* (2013.01);
(Continued)

(58) Field of Classification Search
CPC .. G07G 1/0009; G07G 1/0018; H01Q 1/2216; H01Q 9/0407; H01Q 1/22;
(Continued)

(56) References Cited

U.S. PATENT DOCUMENTS 2,374,892 A * 5/1945 Peterson .................. H01Q 1/30
33/732
2002/0183882 A1 12/2002 Dearing et al.
(Continued)

FOREIGN PATENT DOCUMENTS

JP 2003-099733 A 4/2003
JP 2005-267075 A 9/2005

OTHER PUBLICATIONS

Notice of Reasons for Refusal dated Apr. 21, 2020 in corresponding Japanese Patent Application No. 2016-145651, 6 pages.
(Continued)

*Primary Examiner* — Allen C Chein
*Assistant Examiner* — Denisse Y Ortiz Roman
(74) *Attorney, Agent, or Firm* — Kim & Stewart LLP

(57) ABSTRACT

A reading apparatus includes a tray having a first surface side and a second surface side opposite the first surface side, an antenna unit disposed on the first surface side of the tray and configured to transmit a radio wave signal for reading a wireless tag and to receive a radio wave signal from the wireless tag, and a controller attached to the tray on the second surface side and configured to control the antenna unit to transmit the radio wave signal for reading the wireless tag. The controller reads data in the radio wave signal from the wireless tag received by the antenna unit. The tray includes at least one of an electromagnetic wave reflecting material or an electromagnetic wave absorbing material disposed between the antenna unit and the controller so as to block the radio wave signal for reading the wireless tag from reaching the controller.

13 Claims, 2 Drawing Sheets

(51) Int. Cl.
*G06K 7/10* (2006.01)
*G06K 7/00* (2006.01)
*G06K 19/07* (2006.01)
*G06Q 20/20* (2012.01)
*H01Q 9/04* (2006.01)

(52) U.S. Cl.
CPC ..... *G06K 7/10316* (2013.01); *G06K 19/0723* (2013.01); *G06Q 20/208* (2013.01); *H01Q 1/2216* (2013.01); *G07G 1/0018* (2013.01); *H01Q 1/22* (2013.01); *H01Q 9/0407* (2013.01)

(58) Field of Classification Search
CPC ............. G06K 7/10316; G06K 7/0008; G06K 7/10099; G06K 19/0723; G06Q 20/208
USPC .......................................................... 705/23
See application file for complete search history.

(56) References Cited

U.S. PATENT DOCUMENTS

| | | |
|---|---|---|
| 2003/0029862 A1 | 2/2003 | Clothier |
| 2003/0075602 A1 | 4/2003 | Wike, Jr. et al. |
| 2003/0164243 A1 | 9/2003 | Arakawa et al. |
| 2006/0255954 A1* | 11/2006 | Sorenson, Jr. ....... H01Q 1/3208 340/572.8 |
| 2008/0243626 A1* | 10/2008 | Stawar .................. G06Q 30/02 705/23 |
| 2009/0091449 A1 | 4/2009 | Claessen |
| 2010/0171617 A1 | 7/2010 | Sano |
| 2010/0176928 A1* | 7/2010 | Isomura ................... H04B 5/02 340/10.3 |
| 2010/0288837 A1 | 11/2010 | Tomiyama et al. |
| 2011/0199211 A1 | 8/2011 | Campero et al. |
| 2012/0105205 A1 | 5/2012 | Claessen |
| 2012/0218081 A1 | 8/2012 | Blake et al. |
| 2013/0126611 A1 | 5/2013 | Kangas et al. |
| 2013/0134843 A1 | 5/2013 | Molewyk et al. |
| 2014/0184391 A1 | 7/2014 | Elizondo |
| 2014/0266728 A1 | 9/2014 | Zeng et al. |
| 2015/0302379 A1 | 10/2015 | Terahara |
| 2015/0302708 A1 | 10/2015 | Hattori |
| 2016/0055447 A1* | 2/2016 | Sehmer ............. G06K 7/10415 235/385 |
| 2017/0330426 A1 | 11/2017 | Jaffri et al. |
| 2017/0372290 A1 | 12/2017 | Terahara et al. |
| 2018/0039967 A1 | 2/2018 | Murofushi |
| 2018/0167732 A1 | 6/2018 | Kim et al. |

OTHER PUBLICATIONS

Extended European Search Report dated Jan. 11, 2018 in corresponding European Patent Application No. 17183067.2, 7 pages.

* cited by examiner

READING APPARATUS

CROSS-REFERENCE TO RELATED APPLICATION

This application is a continuation of U.S. patent application Ser. No. 15/647,791, filed Jul. 12, 2017, which application is based upon and claims the benefit of priority from Japanese Patent Application No. 2016-145651, filed Jul. 25, 2016, the entire contents of which are incorporated herein by reference.

FIELD

An embodiment described herein relates generally to a reading apparatus.

BACKGROUND

For sales data processing, there is a reading apparatus that makes use of RFID (Radio Frequency Identification). This reading apparatus includes an antenna that transmits and receives radio waves for reading data stored in an RFID tag attached to a commodity or item. When used, the reading apparatus is connected to a POS (Point Of Sales) terminal disposed on a register counter, for example.

Such a reading apparatus is capable of collectively reading a plurality of RFID tags. In this regard, the RFID reading apparatus making use of the RFID may be faster than a sales data processing apparatus making use of a barcode reader, which requires each commodity or item to be read/scanned individually.

However, in existing reading apparatuses making use of the RFID, to prevent an antenna and a control unit, which controls transmission and reception of the antenna, from adversely affecting each other, the antenna and the control unit are disposed apart from each other. Therefore, labor and time for separately setting the antenna and the control unit and a larger space for setting up the antenna and the control unit are necessary.

In addition to the reading apparatus that reads the RFID tag explained above, the same problem is present in a reading apparatus that reads data from other wireless tag types that use a wireless technique other than the RFID.

DETAILED DESCRIPTION

In general, according to one embodiment, a reading apparatus includes a tray having a first surface side and a second surface side opposite the first surface side, an antenna unit disposed on the first surface side of the tray and configured to transmit a radio wave signal for reading a wireless tag and to receive a radio wave signal from the wireless tag, and a controller attached to the tray on the second surface side and configured to control the antenna unit to transmit the radio wave signal for reading the wireless tag. The controller reads data in the radio wave signal from the wireless tag received by the antenna unit. The tray includes at least one of an electromagnetic wave reflecting material or an electromagnetic wave absorbing material disposed between the antenna unit and the controller so as to block the radio wave signal for reading the wireless tag from reaching the controller.

Figure 1:
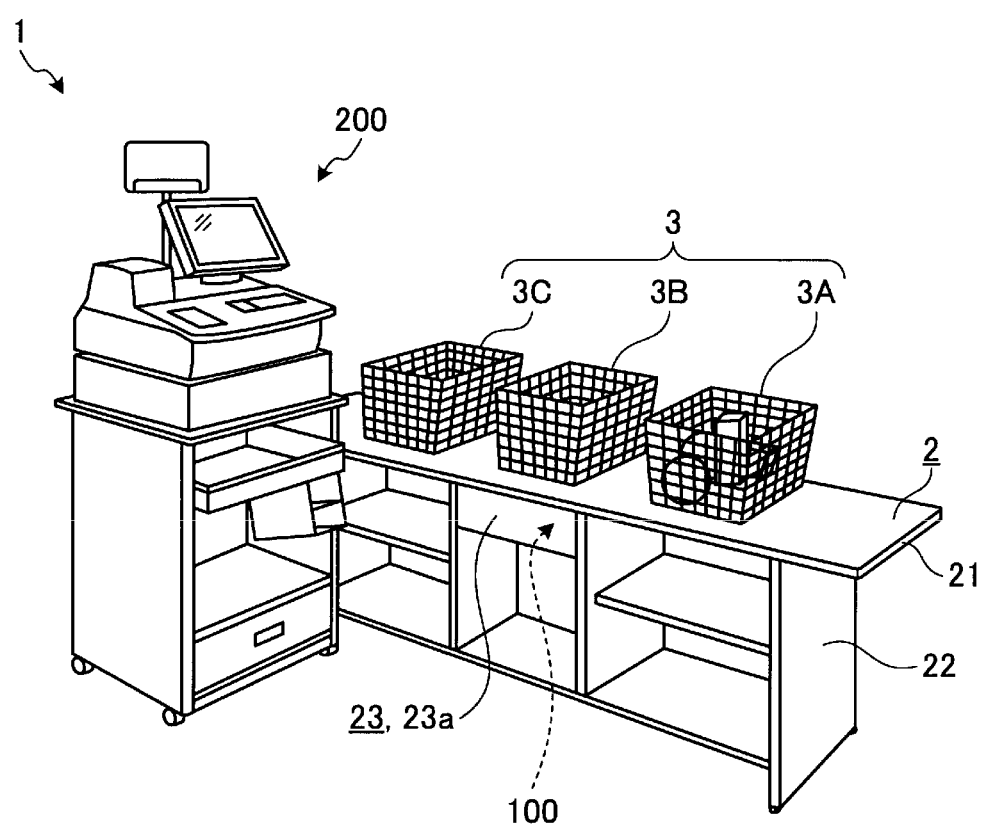
FIG. 1 is a perspective view depicting a configuration and an exterior of a sales data processing system including a reading apparatus according to an embodiment.

An example embodiment is explained with reference to the drawings. FIG. 1 is a perspective view showing the configuration and the exterior of a sales data processing system 1 including a reading apparatus 100. The sales data processing system 1 includes the reading apparatus 100 and a POS terminal apparatus 200. The sales data processing system 1 has a checkout counter 2 and uses shopping baskets 3 (e.g., 3A, 3B, and 3C).

The reading apparatus 100 reads data stored in a wireless tag (e.g., an RFID tag) attached to a commodity or an item of merchandise that has put in the shopping basket 3B, for example. The data stored by the RFID tag is, for example, a commodity code. The POS terminal apparatus 200 obtains, through inquiry to a database in an external server (not shown in the figure), commodity data such as a price set on the basis of the commodity code that has been read by the reading apparatus 100 and then registers the obtained commodity data as sales data. The POS terminal apparatus 200 performs settlement processing based on the price of the commodity (or commodities) registered as the sales data.

The reading apparatus 100 is incorporated in the checkout counter 2. Here, the checkout counter 2 has length sufficient for placing three to four shopping baskets 3 side by side. In FIG. 1, three shopping baskets 3A to 3C are placed on the checkout counter 2.

The checkout counter 2 includes a top plate 21 and a shelf 22. The top plate 21 functions as a table for placing the shopping baskets 3. The shelf 22 is used as a storage location and functions as a base for supporting the top plate 21. A longitudinal dimension (length) of the top plate 21 is the same as or slightly larger than the longitudinal dimension (length) of the shelf 22.

The shelf 22 includes, at a midpoint along its length, a housing section 23 for housing the reading apparatus 100. The housing section 23 is provided right under the top plate 21. The housing section 23 shown in FIG. 1 includes a front plate 23a. However, in some embodiments, the front plate 23a may be absent. Further, in some embodiments, the housing section 23 may be a drawer.

A region of the top plate 21 above the housing section 23 is a region where the RFID tag can be read by the reading apparatus 100 and is a space for placing the shopping basket 3B to be read. The region of the top plate 21 above the housing section 23 can be referred to as "a reading region."

The top plate 21 has, on both sides of the reading region, spaces in which a shopping basket 3 can be placed. The space on the side of the reading region closer to the POS terminal apparatus 200 is used as a space for the shopping basket 3C. The opposite side of the reading region is used as a space for the shopping basket 3A. The shopping basket 3A is on standby for reading by the reading apparatus 100. The shopping basket 3C has already been read by the reading apparatus 100 and is to be subjected to settlement processing by the POS terminal apparatus 200.

Figure 2:
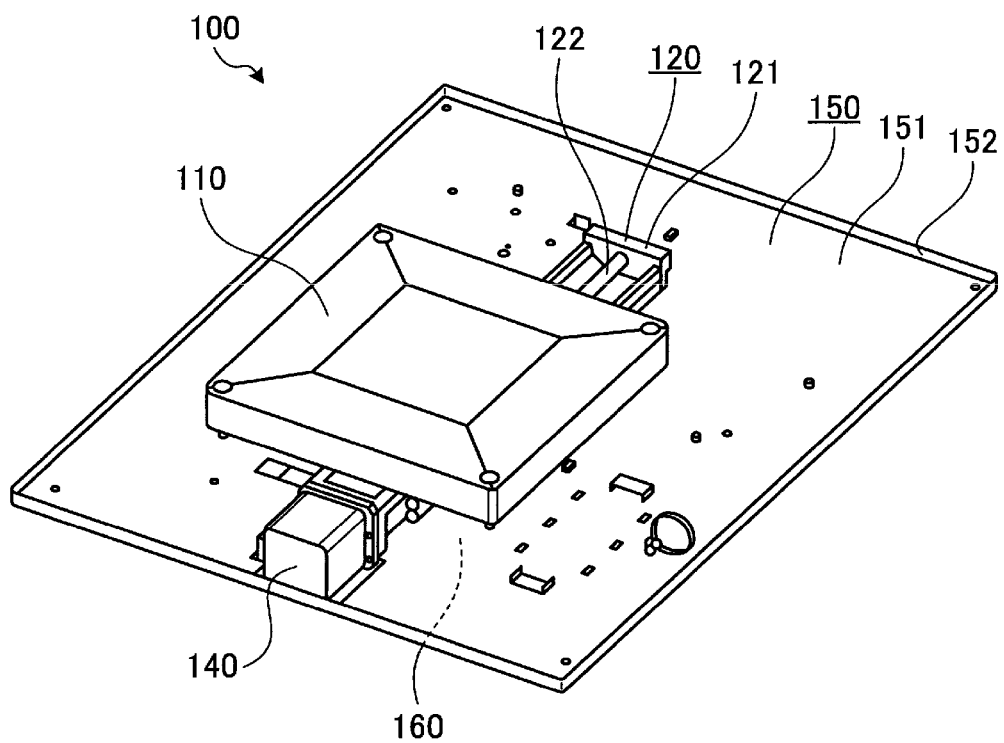
FIG. 2 is a perspective view depicting an exterior of the reading apparatus.
Figure 3:
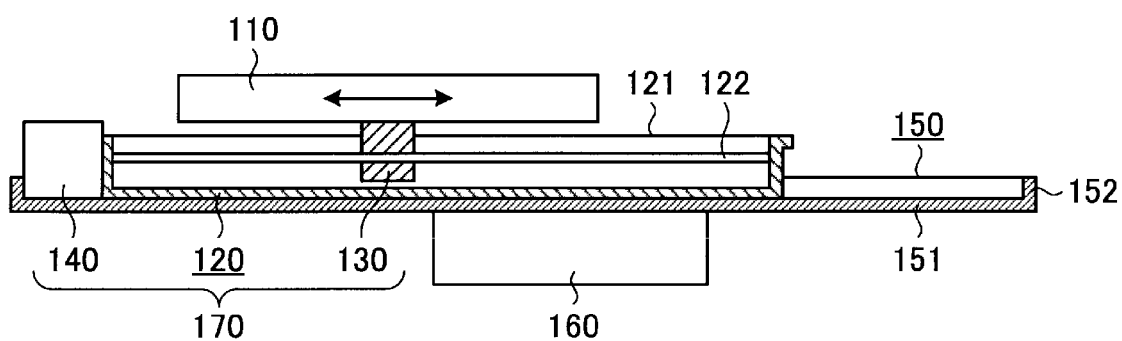
FIG. 3 is a partial cross-sectional view of the structure of the reading apparatus.

FIG. 2 is a perspective view showing the exterior of the reading apparatus 100. FIG. 3 is a partial sectional view of the structure of the reading apparatus 100. The reading apparatus 100 includes an antenna unit 110, a rail 120, a slider 130, a motor 140, a tray 150, and a control unit 160.

The antenna unit 110 may be, for example, a planar patch antenna housed in a rectangular parallelepiped housing. The antenna unit 110 is used for both of transmission and reception and transmits radio waves at a predetermined frequency.

The control unit 160 can be a control board on which various chips such as a CPU (Central Processing Unit), a ROM (Read Only Memory), and a RAM (Random Access Memory) are mounted. The control unit 160 controls the transmission and reception of radio waves by the antenna unit 110 and reads data from and writes data to the RFID tag. The control unit 160 includes a port for connection of the antenna unit 110. The antenna unit 110 is connected to the port by a coaxial cable or the like.

In this example, the tray 150 is made of sheet metal, in particular is formed of a metal which is an electromagnetic wave reflecting material or an electromagnetic wave absorbing material. The tray 150 includes a square flat plate 151 and a low rib 150 projecting upwards (towards the top plate 21) on the perimeter of the flat plate 151. The rib 152 is reinforcement to prevent the flat plate 151 from bending.

In some embodiments, the tray 150 may be made of, for example, resin to which a metal foil has been applied on at least one surface thereof rather than being made of sheet metal (or entirely of metal). The tray 150 is to have electromagnetic wave reflectivity or electromagnetic wave absorption.

The tray 150 has a shape and an area similar to a shape and a coverage area of the shopping basket 3 projected onto the top plate 21. The reading region of the reading apparatus 100 is above the tray 150.

The antenna unit 110 is provided on an upper surface on a side of the flat plate section 151 surrounded by the rib 152. The control unit 160 is provided on a lower surface of the flat plate section 151. That is, the flat plate section 151 is interposed between the antenna unit 110 and the control unit 160. Consequently, the antenna unit 110 and the control unit 160 are prevented from adversely affecting each other. More specifically, the influence of radio waves is eliminated or reduced between the antenna unit 110 and the control unit 160. Therefore radio waves transmitted and received by the antenna unit 110 are prevented from adversely affecting the operation of the control unit 160, and the presence of the control unit 160 is prevented from hindering reading and writing of the RFID tag.

The rail 120, the slider 130, and the motor 140 form a moving mechanism 170 on the upper surface of the flat plate 151 that is capable of moving the antenna unit 110 in a predetermined direction. The slider 130 is attached to the bottom of the antenna unit 110. The slider 130 is capable of moving on the rail in a direction parallel to a length (longitudinal direction) of the rail 120.

The rail 120 is attached to the tray 150, extending from the front to the back of the reading apparatus 100 (perpendicular to the longitudinal direction of the checkout counter 2). The rail 120 includes a case 121 and a guide 122. The case 121 is an elongated box that is open upwards (towards the top plate 21). The guide 122 is a shaft with screw threads on the outer circumferential surface. The guide 122 is housed in the case 121 with the axial direction thereof set in the longitudinal direction of the case 121. Both ends of the guide 122 are fixed to two inner side surfaces of the case 121, respectively. Thus, the guide 122 is lifted off from the bottom of the case 121.

The slider 130 includes a screw hole that meshes with the screw threads of the guide 122 and moves in the axial direction of the guide 122 according to rotation of the guide 122. The motor 140 generates a driving force for rotating the guide 122. A moving direction of the slider 130 is switched according to a rotating direction of the motor 140.

The reading apparatus 100 under the top plate 21 of the checkout counter 2 reads the RFID tag attached to the commodity stored in the shopping basket 3B.

During the reading, the control unit 160 actuates the motor 140, moves the antenna unit 110 along the rail 120, and causes the antenna unit 110 to transmit radio waves according to the movement. Since the antenna unit 110 transmits while moving, even when a plurality of wireless tags are irregularly arranged in the reading region, it is still possible to collectively read the plurality of wireless tags. Many commodities may overlap one another in the shopping basket 3B. Therefore, if the antenna transmits radio waves only in a fixed direction from a fixed position, RFID tags attached to some of the commodities may be in a blind spot of the radio waves. However, according to this embodiment, it is possible to improve a success rate of the collective reading process.

In the reading apparatus 100, the flat plate 151 (of the tray 150) has electromagnetic wave reflectivity or electromagnetic wave absorption. Therefore, it is possible to prevent radio waves transmitted and received by the antenna unit 110 from adversely affecting the operation of the control unit 160.

In the reading apparatus 100, since the flat plate 151 is planar, it is possible to effectively direct radio waves emitted by the antenna unit 110 to the shopping basket 3B.

According to this embodiment, the antenna unit 110 and the control unit 160 are integrated as a single unit without being separately provided. That is, the reading apparatus 100 is a single, integrated unit. Therefore, the reading apparatus 100 is low maintenance. For example, if a failure occurs, the reading apparatus 100 can be replaced as a unit. Therefore, in a store, there is an advantage that, for example, a time in which a checkout lane is out of order is reduced because it is possible to swap in a substitute unit, and then take the faulty unit elsewhere for repair. Therefore, the repairing can be performed in a satisfactory work environment. A repair person visiting the store only has to be proficient in unit removal/replacement. Therefore, it is possible to prevent the time of an expert repair person from being consumed by visiting the store. Furthermore, it is possible to eliminate the inconvenience a failed immediate repair caused by a lack of replacement components store site.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A checkout system comprising:
  a checkout counter including a top plate extending in a first direction and on which a plurality of baskets for commodities is to be placed, the top plate including a reading region; and
  a reading apparatus arranged directly under the reading region and comprising:
    a tray having a first surface side and a second surface side opposite the first surface side, an antenna above the first surface side of the tray and configured to transmit a radio wave signal for reading a wireless tag attached to each commodity positioned in the reading region and to receive a radio wave signal from the wireless tag, an antenna moving mechanism attached to the first surface side of the tray and configured to move the antenna along a second direction that is perpendicular to the first direction and parallel to the tray, and a controller attached to the tray on the second surface side and configured to control the antenna to transmit the radio wave signal for reading the wireless tag, and to read data in the radio wave signal from the wireless tag received by the antenna, wherein the tray comprises at least one of an electromagnetic wave reflecting material and an electromagnetic wave absorbing material disposed between the antenna and the controller so as to block the radio wave signal for reading the wireless tag from reaching the controller.

2. The checkout system according to claim 1, wherein the antenna moving mechanism includes a rail that extends in the second direction and is configured to move the antenna along the rail when the antenna is transmitting the radio wave signal.

3. The checkout system according to claim 1, wherein the tray comprises a sheet of metal.

4. The checkout system according to claim 1, wherein the tray comprises a resin sheet and a metal foil covering a surface of the resin sheet.

5. The checkout system according to claim 1, wherein the wireless tag is an RFID tag.

6. The checkout system according to claim 1, wherein the reading region is substantially transparent to the radio wave signal.

7. The checkout system according to claim 1, wherein the tray and the antenna have a planar shape and are arranged in parallel.

8. The checkout system according to claim 1, wherein the tray has a larger area than the antenna when viewed from above with respect to the first surface side of the tray.

9. The checkout system according to claim 1, wherein the tray comprises a flat plate portion between the antenna and the controller and a rib on an outer perimeter of the flat plate portion, the rib projecting from the flat plate portion towards the top plate of the checkout counter.

10. The checkout system according to claim 1, further comprising:

a point-of-sale terminal connected to the reading apparatus and configured to perform a registration process with respect to each commodity according to the read data.

11. The checkout system according to claim 10, wherein the point-of-sale terminal is arranged next to the checkout counter.

12. The checkout system according to claim 11, wherein the point-of-sale terminal is arranged such that a user interface thereof faces to the first direction.

13. The checkout system according to claim 10, wherein the point-of-sale terminal is configured to perform a checkout process for each commodity registered in the registration process.

* * * * *